(12) United States Patent
Matsuda et al.

(10) Patent No.: US 6,586,104 B2
(45) Date of Patent: Jul. 1, 2003

(54) COATING LIQUID FOR FORMING A TRANSPARENT COATING AND SUBSTRATE WITH A TRANSPARENT COATING

(75) Inventors: Masayuki Matsuda, Kitakyushu (JP); Nobuaki Yoshida, Kitakyushu (JP); Tsuguo Koyanagi, Kitakyushu (JP); Michio Komatsu, Kitakyushu (JP)

(73) Assignee: Catalysts & Chemicals Industries Co., Ltd. (JP)

( * ) Notice: Subject to any disclaimer, the term of this patent is extended or adjusted under 35 U.S.C. 154(b) by 0 days.

(21) Appl. No.: 09/011,886

(22) PCT Filed: Jun. 20, 1997

(86) PCT No.: PCT/JP97/02138

§ 371 (c)(1),
(2), (4) Date: Feb. 23, 1998

(87) PCT Pub. No.: WO97/49775

PCT Pub. Date: Dec. 31, 1997

(65) Prior Publication Data

US 2002/0011182 A1 Jan. 31, 2002

(30) Foreign Application Priority Data

Jun. 24, 1996 (JP) .............................. 8-182767
Jan. 31, 1997 (JP) .............................. 9-18132

(51) Int. Cl.⁷ ...................... B32B 9/00; C08G 77/00; C08L 83/00
(52) U.S. Cl. ............. 428/447; 106/287.13; 106/287.16; 106/287.19; 524/588; 528/12; 528/14; 528/17
(58) Field of Search ................... 428/447, 699, 428/702, 689, 1; 106/287.11, 287.14, 287.15, 287.13, 287.16; 524/588; 528/12, 14, 17

(56) References Cited

U.S. PATENT DOCUMENTS

| 4,753,827 A | | 6/1988 | Yoldas et al. ................ 427/387 |
| 4,799,963 A | * | 1/1989 | Basil et al. ............ 106/287.13 |
| 5,306,759 A | * | 4/1994 | Sakagami et al. .......... 524/379 |
| 5,789,476 A | * | 8/1998 | Iryo et al. .................... 524/430 |

FOREIGN PATENT DOCUMENTS

| JP | 06329988 | 11/1994 |
| JP | 07102214 | 4/1995 |

OTHER PUBLICATIONS

Japanese Patent Laid–Open No. 63–81176, Abstract, Apr. 12, 1988, 1 p., English language.
Japanese Patent Laid–Open No. 63–123838, Abstract, May 27, 1988, 1 p., Japanese language.
Japanese Patent Laid–Open No. 3–20377, Abstract, Jan. 29, 1991, 1 p., English language.
Japanese Patent Laid–Open No. 5–124818, Abstract, May 21, 1993, 1 p., English language.
Japanese Patent Laid–Open No. 7–157715, Abstract, Jun. 20, 1995, 1 p., English language.
Japanese Patent Laid–Open No. 7–331172, Abstract, Dec. 19, 1995, 1 p., English language.
Japanese Patent Laid–Open No. 63–123838, Abstract, May 27, 1988, 1 p., Japanese language.
Japanese Patent Laid–Open No. 3–20377, Abstract, Jan. 29, 1991, 1 p., English language.

* cited by examiner

Primary Examiner—Shrive P. Beck
Assistant Examiner—Elena Tsoy
(74) Attorney, Agent, or Firm—Webb Ziesenheim Logsdon Orkin & Hanson, P.C.

(57) ABSTRACT

A coating liquid for forming a transparent coating comprising fine particles of an inorganic compound and a hydrolyzate of an organosilicon compound represented by the general formula (I):

$$R_n Si(OR')_{4-n} \qquad (I)$$

wherein R and R' represent organic groups which may be identical to each other or different from each other, and n is an integer of 1 to 3. This coating liquid ensures excellent substrate wettability and compatibility with various organic solvents so that the printability and applicability thereof are desirable, with the result that a transparent coating film of high uniformity, for example, a flattening coating film, can be formed. The present invention comprises a substrate having a transparent coating film formed on the substrate surface from the above coating liquid.

12 Claims, No Drawings

COATING LIQUID FOR FORMING A TRANSPARENT COATING AND SUBSTRATE WITH A TRANSPARENT COATING

TECHNICAL FIELD

The present invention relates to a coating liquid for forming a transparent coating and a substrate with transparent coating formed from the coating liquid. More particularly, the present invention is concerned with a coating liquid capable of forming on a substrate surface a coating film which has excellent resistances to heat, moisture, chemicals and plasma, ensures a low level of gas elimination and exhibits desirable transparency and flatness and is concerned with a substrate with transparent coating having the above coating film formed on a substrate surface.

BACKGROUND ART

In the field of, for example, electronic materials, organic resins such as acrylic and polyester resins are commonly used as materials for forming flattening coating films or insulating protective coating films.

For example, in the TFT liquid crystal display, the construction is employed such that, for flattening the irregularity on the side of a substrate with TFT array, an organic resin coating having a thickness of about some microns is formed on a substrate including driving circuits to thereby flatten the substrate surface and, thereafter, a display electrode of, for example, ITO is mounted thereon.

However, the above involves problems in that, in the formation of the display electrode (ITO film) on a flattening coating film according to the sputtering method or the like, the temperature beyond which the organic flattening coating film cannot be resistant to heat is so low (150 to 250° C.) that high temperature and plasma resistances are poor thereby inviting a discoloration of coating film and a drop of light transmission. Further, the problem has been encountered such that, when the inside of the apparatus is evacuated prior to sputtering, gas components such as uncured components and desorption components are desorbed from the resin coating film to thereby retard the vacuum reaching time in the apparatus or pollute the inside of the apparatus.

Moreover, the use of a coating film prepared from an organic resin as a color filter protective coating film of a liquid crystal display equipped with a color filter also encounters the heat resistance problem.

On the other hand, an inorganic coating film is superior to the above organic resin coating film with respect to high temperature and plasma resistances.

Examples of such inorganic coating films include dry process formed coating films of $SiO_2$, $Ta_2O_5$ and $Si_3N_4$ and coating films of SOG which is a hydrolyzate of an organosilicon compound such as an alkoxysilane. The former dry process formed coating films invite high process cost, and the latter SOG coating films require curing of the coating films at about 400° C. or higher to thereby disenable use as a color filter protective coating film whose heat resistance temperature is 250° C. or below. Moreover, these inorganic coating films have drawbacks in that, when the thickness of coating film is increased so as to enable flattening, cracks occur. In semiconductor devices, the above coating film of SOG is used as an insulating film for effecting an insulation between a substrate and a metal wiring layer such as a wiring layer of aluminum or between metal wiring layers. In these semiconductor devices, an interlayer connecting hole (contact hole) is formed between a lower wiring layer and an upper wiring layer of multiple wiring layers and, thereafter, the resist used during the formation of the interlayer connecting hole is removed by an oxygen plasma asher device. Thus, the problem is encountered that, at that time, the film surface exposed to the interlayer connecting hole is oxidized by oxygen plasma to thereby become porous in the SOG coating film, which is composed of a hydrolyzate of an organosilicon compound. The resultant porous portion adsorbs a large amount of water which is released during, for example, the heating conducted at a later stage thereby inviting a connection failure between upper and lower wiring layers.

Furthermore, a coating film obtained from an alkyltrihydroxysilane polymer can be mentioned as an organic/inorganic composite coating film. This coating film permits a thickness increase, so that desirable flatness can be imparted thereto. However, this coating film has a drawback in that it cannot be satisfactorily cured by heating at about 300° C. or below, resulting in a poor film strength. Further, there is the problem that the coating film per se has high hydrophobicity, so that, for example, when resists are applied to the coating film, a coating liquid repulsion occurs thereby rendering coating film formation difficult.

The present invention has been made with a view toward solving the above problems of the prior art. Therefore, an object of the present invention is to provide a coating liquid for forming a transparent coating, which contains fine particles of an inorganic compound and a hydrolyzate of an organosilicon compound (silsesquioxane polymer).

Other objects of the present invention are to provide a substrate with transparent coating formed from the above coating liquid, to provide a liquid crystal display having a flattening coating film formed from the above coating liquid, to provide a liquid crystal display having a color filter with protective coating film formed from the above coating liquid and to provide a semiconductor device having an insulating coating film formed from the above coating liquid.

DISCLOSURE OF THE INVENTION

The coating liquid for forming a transparent coating according to the present invention comprises:

fine particles of an inorganic compound, and a hydrolyzate of an organosilicon compound represented by the general formula (I):

$$R_n Si(OR')_{4-n} \qquad (I)$$

wherein R and R' represent organic groups which may be identical to each other or different from each other, and n is an integer of 1 to 3.

The above organosilicon compound is preferably a trifunctional alkoxysilane represented by the general formula:

$$RSi(OR')_3 \qquad (II)$$

wherein R and R' represent organic groups which may be identical to each other or different from each other.

The above organosilicon compound hydrolyzate is preferably a hydrolyzate of an organosilicon compound containing a transition metal element.

This hydrolyzate of transition metal containing organosilicon compound is preferably one obtained by hydrolyzing a mixture of the organosilicon compound represented by the general formula (I) and a transition metal compound in an organic solvent containing water.

The above inorganic compound fine particles are preferably fine particles of an oxide of at least one element selected from the group consisting of Ti, Zr, V, Nb, Cr, Mo, W, Al, Mn, Fe, Co, Ni and Si.

The substrate with transparent coating according to the present invention comprises a transparent coating film formed from the above coating liquid for forming a transparent coating.

The first liquid crystal display according to the present invention comprises a liquid crystal display element having a transparent flattening coating film formed from the above coating liquid for forming a transparent coating.

The second liquid crystal display according to the present invention comprises a color filter having a transparent protective coating film formed from the above coating liquid for forming a transparent coating.

The semiconductor device according to the present invention comprises a semiconductor element having an insulating coating film formed from the above coating liquid for forming a transparent coating.

BEST MODE FOR CARRYING OUT THE INVENTION

The coating liquid for forming a transparent coating, substrate with transparent coating and use thereof according to the present invention will be described in detail below.

Coating Liquid for Forming Transparent Coating

The coating liquid for forming a transparent coating according to the present invention comprises fine particles of an inorganic compound and a hydrolyzate of an organosilicon compound represented by the general formula (I).

(Fine Particles of Inorganic Compound)

The inorganic compound fine particles are preferably fine particles of an oxide of at least one element selected from the group consisting of Ti, Zr, V, Nb, Cr, Mo, W, Al, Mn, Fe, Co, Ni and Si. It is especially preferred to employ fine particles of an oxide selected from among $ZrO_2$, $TiO_2$, $SiO_2$ and $SnO_2$ or fine particles of a composite oxide of at least two members selected from among these.

Conventional fine particles can be used as these oxide fine particles. The process for producing the same is not particularly limited. For example, fine oxide particles obtained by hydrolyzing a metal salt or a metal alkoxide can be used in the present invention.

It is preferred that these fine oxide particles have a large amount of OH group on their surface in order to enhance the applicability and the adhesion thereof to substrate.

The average particle size of the above fine oxide particles preferably ranges from 5 to 50 nm.

(Organosilicon Compound)

The organosilicon compound for use in the present invention is represented by the general formula (I):

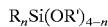

$$R_nSi(OR')_{4-n} \quad (I)$$

wherein R and R' represent organic groups which may be identical to each other or different from each other, and n is an integer of 1 to 3.

R represents, for example, an alkyl such as methyl, ethyl or propyl, an aryl such as phenyl, an alkenyl such as vinyl, or a substituted alkyl such as γ-methacryloxypropyl, γ-glycidoxypropyl, γ-chloropropyl, γ-mercaptopropyl, γ-aminopropyl or trifluoromethyl.

R' represents, for example, an alkyl such as methyl, ethyl, propyl or butyl, an aryl such as phenyl, or a substituted alkyl such as acetyl or β-methoxyethoxy. The above organosilicon compound is preferably a trifunctional alkoxysilane represented by the general formula (II):

$$RSi(OR')_3 \quad (II)$$

wherein R and R' represent organic groups which may be identical to each other or different from each other. Examples of suitable alkoxysilanes include methyl trimethoxysilane, methyltriethoxysilane, ethyltriethoxysilane, isobutyltrimethoxysilane, phenyltrimethoxysilane, γ-glycidoxypropyltrimethoxysilane, vinyltrimethoxysilane, γ-aminopropyltriethoxysilane, γ-methacryloxypropyltrimethoxysilane and trifluoromethyltrimethoxysilane.

(Hydrolyzate of Organosilicon Compound)

In the present invention, use is made of a hydrolyzate of the above organosilicon compound. The above organosilicon compound is converted to a silsesquioxane polymer by a hydrolysis followed by a polycondensation. This silsesquioxane polymer preferably has a ladder polymer structure represented by the formula (III):

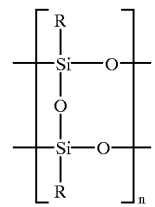

(III)

Further, in the present invention, it is preferred that the above silicon compound hydrolyzate be one containing a transition metal element.

At least one element selected from among Ti, V, Cr, Mn, Fe, Co, Ni, Y, Al, Zr, Nb, Mo and W can be the transition metal element.

The above organosilicon compound hydrolyzate containing a transition metal element is, for example, a ladder structure compound or cage structure compound represented by the formula (IV):

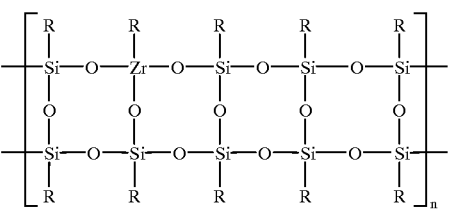

(IV)

In this transition metal containing organosilicon compound hydrolyzate, the transition metal may be bonded in substitution for Si as in the above formula (IV), may be bonded as an element three-dimensionally crosslinking the polysiloxane oligomer, or may be adsorbed onto this polymer. However, it is contemplated that the transition metal is not contained in the form of fine particles, especially, fine oxide particles in the organosilicon compound.

A three-dimensional crosslinking occurs at low temperatures in the above organosilicon compound hydrolyzate containing the transition metal element, thereby enabling obtaining a transparent coating film having a satisfactory hardness.

The refractive index, dielectric constant and insulating properties of the transparent coating film can be controlled by changing the content of transition metal in the organosilicon compound hydrolyzate.

The above organosilicon compound hydrolyzate containing the transition metal can be obtained by hydrolyzing a mixture of the organosilicon compound represented by the general formula (I) and a transition metal compound in an organic solvent containing water.

Examples of suitable transition metal compounds include metal alkoxides such as tetrabutoxyzirconium and tetraisopropoxytitanium; zirconium or titanium acetylacetonate chelate compounds; salts such as titanium chloride; and oxy salts such as zirconium oxychloride.

Examples of suitable organic solvents include alcohols such as ethanol, propanol, butanol, 4-methylcyclohexanol and diacetone alcohol; ketones such as acetone, methyl ethyl ketone and methyl isobutyl ketone; polyhydric alcohols such as ethylene glycol, diethylene glycol and hexylene glycol; ethers such as ethylene glycol monomethyl ether, ethylene glycol monoethyl ether, propylene glycol monomethyl ether, propylene glycol monoethyl ether, diethylene glycol monomethyl ether and diethylene glycol monoethyl ether; and acetates such as ethylene glycol monomethyl ether acetate, ethylene glycol monoethyl ether acetate, propylene glycol monomethyl ether acetate, propylene glycol monoethyl ether acetate, diethylene glycol monomethyl ether acetate and diethylene glycol monoethyl ether acetate. These organic solvents may be used either individually or in combination.

The above organosilicon compound hydrolyzate containing the transition metal can be produced by the following method comprising:

(i) mixing 100 parts by weight (in terms of $SiO_2$) of an organosilicon compound represented by the formula (I) and 0.1 to 30 parts by weight (in terms of oxide) of a transition metal compound with 100 to 2,000 parts by weight of an appropriate organic solvent and heating the mixture at 40 to 120° C. to thereby obtain a homogeneous solution; and (ii) adding pure water and a catalyst (acid or alkali) for hydrolysis to the solution and heating the mixture for a given period of time.

The amount of water added for hydrolysis preferably ranges from 50 to 200 parts by weight per 100 parts by weight (in terms of $SiO_2$) of the organosilicon compound.

It is preferred that the average molecular weight of the thus obtained transition metal containing organosilicon compound hydrolyzate range from 1,000 to 100,000, especially, from 5,000 to 50,000 in terms of polystyrene. This range of average molecular weight is preferred from the viewpoint that the adherence to substrate, transparency, hardness, moisture resistance, flatness and insulating properties of the coating film are enhanced.

When the average molecular weight is smaller than 1,000, the coating film having its thickness increased suffers from an extreme thermal shrinkage thereby inviting the danger of cracking. On the other hand, when the average molecular weight is larger than 100,000, the amount of hydroxyl is very small with the result that the adherence to substrate is deteriorated and the hardness of the coating film is likely to be low. The above average molecular weight is a value in terms of polystyrene obtained by measuring by gel permeation chromatography (GPC).

(Coating Liquid for Forming Transparent Coating)

The coating liquid for forming a transparent coating according to the present invention may be composed of:

fine particles of an inorganic compound, the above hydrolyzate of organosilicon compound, and water and/or an organic solvent.

The inorganic compound fine particles are preferably contained in the coating liquid in an amount of 2 to 50% by weight, still preferably, 3 to 40% by weight in terms of oxide.

The organosilicon compound hydrolyzate is preferably contained in the coating liquid in an amount of 5 to 60% by weight, still preferably, 7 to 40% by weight.

The total solid content, i.e., concentration of organosilicon compound hydrolyzate and inorganic compound fine particles in the coating liquid for forming a transparent coating according to the present invention preferably ranges from 7 to 60% by weight, still preferably, from 10 to 50% by weight, depending on the application method and coating thickness.

According to necessity, the coating liquid for forming a transparent coating according to the present invention may be doped with additives for improving wetting and leveling properties prior to use.

The coating liquid for forming a transparent coating according to the present invention ensures excellent substrate wettability, excellent adherence to substrates and excellent compatibility with various organic solvents by virtue of the organosilicon compound hydrolyzate and inorganic compound fine particles contained therein. Accordingly, the coating liquid exhibits excellent printability and applicability to thereby enable obtaining a highly uniform flattening coating film. Moreover, the refractive index, dielectric constant and insulating properties of the coating film can be controlled by incorporating a transition metal in the organosilicon compound hydrolyzate.

The transparent coating film formed from the above coating liquid for forming a transparent coating has excellent moisture-proofing capability. An inorganic coating film can easily be formed on this transparent coating film by, for example, sputtering, vacuum evaporation or CVD with excellent adherence ensured therebetween.

Substrate with Transparent Coating

The substrate with transparent coating according to the present invention comprises a transparent coating film formed by coating a substrate surface with the above coating liquid for forming a transparent coating.

Customary application methods such as spin coating, dip coating, roll coating, spray coating, flexographic printing and screen printing are employed in coating the substrate with the above coating liquid. The desired transparent coating film can be obtained by, after application according to any of the above methods, heating a coated layer at 180 to 350° C.

Although the thickness of the transparent coating film formed by the above methods depends on the use of the substrate, the use of the coating liquid of the present invention leads to formation of a substrate with transparent coating, this transparent coating having a thickness ranging from 0.02 to 10 µm.

The above substrate with transparent coating is used, for example, as the below described flattening material for liquid crystal display or SOG material for semiconductor device and, further, as a resist material for electronic circuit formation, a wave guide channel on silicon chip, a protective coating material for optical fiber, a hard coating material for plastic lens, an overcoating material for cathode ray tube, a chemical resistant coating material, a moisture-proofing coating material, a flattening material or a glass with passivation coating film.

Liquid Crystal Display

The first liquid crystal display of the present invention comprises a liquid crystal display element having a transparent flattening coating film formed by coating a substrate with irregular surface with the above coating liquid for forming a transparent coating.

In particular, in a TFT liquid crystal display, the irregular surface on the side of the substrate with TFT array is flattened by a transparent flattening coating film of 0.2 to 5 μm, preferably, 0.5 to 1.5 μm in thickness which has been formed from the above coating liquid for forming a transparent coating.

The second liquid crystal display of the present invention comprises a color filter having a transparent protective coating film of 0.2 to 5 μm, preferably, 1 to 3 μm in thickness which has been formed from the above coating liquid for forming a transparent coating.

Semiconductor Device

The semiconductor device according to the present invention comprises a semiconductor element having an insulating coating film formed from the above coating liquid for forming a transparent coating.

This insulating coating film is formed as a flattening insulating film which is interposed, for example, between a substrate and a metal wiring layer such as a wiring layer of aluminum in a semiconductor element or between multiple wiring layers in a laminate of at least two metal wiring layers of a semiconductor element. This insulating coating film may be formed as an insulating protective coating film in a PN junction element, a condenser element, a resistor element or the like.

In the semiconductor device including the above multiple wiring layer laminate having at least two metal wiring layers piled one upon another, it is desired that a flattening interlayer insulating coating film of low permittivity having a thickness of 0.05 to 2 μm be formed between neighboring wiring layers.

The above insulating coating film formed in the semiconductor element maintains an extremely dense texture because the coating film exposed to the contact hole is not rendered porous by the oxygen plasma asher at the time of the above resist removal conducted in the formation of the contact hole.

EFFECT OF THE INVENTION

The coating liquid for forming a transparent coating according to the present invention ensures excellent substrate wettability and excellent compatibility with various organic solvents, so that the coating liquid exhibits excellent printability and applicability. Therefore, a highly uniform transparent coating film, for example, a flattening coating film can be formed. A heat treatment of the formed transparent coating film at low temperatures, for example, about 200° C. enables obtaining a transparent coating film with a pencil hardness of about 5 H.

The refractive index, dielectric constant and insulating properties of the transparent coating film formed from the coating liquid for forming a transparent coating according to the present invention can be controlled by changing the transition metal content of the organosilicon compound hydrolyzate. The formed transparent coating film is excellent in transparency, moisture resistance, solvent resistance, alkali resistance, acid resistance and aqua regia resistance.

The transparent coating film formed from the above coating liquid for forming a transparent coating has an excellent heat resistance, so that, even when an inorganic coating film such as ITO coating film is formed on the transparent coating film by, for example, sputtering, vacuum evaporation or CVD, the coating film maintains high transparency without any deterioration thereof and the adherence thereof to the inorganic coating film is excellent.

Further, the above transparent coating film has a low dielectric constant but a high volume resistivity, so that the thickness of the coating film can be decreased as compared with that of conventional organic resin coating film thereby enabling a transparency enhancement.

In particular, when an ITO coating film is formed by sputtering on the flattening coating film or protective coating film formed from the coating liquid of the present invention in the liquid crystal display of the present invention, substantially neither coating film discoloration nor light transmission drop occurs after the sputtering.

Still further, degassing from the transparent coating film is slight at the time of evacuation, so that the high vacuum reaching time in the apparatus is saved at the time of sputtering as compared with that taken in the use of resin coating films to thereby attain a marked improvement of sputtering operation.

Moreover, the membrane stress of the obtained transparent coating film is lower than that of conventional organic coating film, so that substrate warpage attributed to coating film shrinkage after coating film formation, coating film cracking and coating film peeling substantially do not occur without any substantial detriment to, for example, the element disposed under the coating film.

In the liquid crystal display having the TFT array substrate in which the above transparent coating film is formed as a flattening coating film and the liquid crystal display having the color filter in which the above transparent coating film is formed as a protective coating film, the configuration of the surface of the alignment coating film brought into contact with the liquid crystal layer is flattened, so that various effects are exerted such as inhibition of liquid crystal alignment turbulence attributed to surface configuration, prevention of display domain occurrence, reduction of light escape at the time of panel display and improvement of contrast. Accordingly, the yield of liquid crystal display element and display quality are excellent.

The formation of an interlayer insulating coating film for semiconductor device from the coating liquid for forming a transparent coating according to the present invention enables preventing the contact hole insulating coating film from becoming porous at the time of resist removal after the formation of the contact hole by means of the oxygen plasma asher with the result that a dense insulating coating film can be obtained. Further, a denser coating film can be obtained by subjecting an exposed insulating coating film to, for example, oxygen plasma treatment, ion implantation treatment or electron beam irradiation treatment after the formation of the contact hole. As a result, the problems such as conduction failure between upper and lower wiring layers encountered by the conventional SOG coating film of organosilicon compound hydrolyzate can be solved.

Still further, the above insulating coating film obtained from the coating liquid for forming a transparent coating according to the present invention is highly suitable for use in a semiconductor device because its dielectric constant is as low as not greater than 3.

EXAMPLE

The present invention will now be illustrated in greater detail with reference to the following Examples, which in no way limit the scope of the invention.

Example 1
(Preparation of Coating Liquid (1) for Forming a Transparent Coating)

100 g of methyltrimethoxysilane, 200 g of isopropyl alcohol, 60 g of butanol, 8.5 g of zirconium n-butylate and 0.8 g of acetylacetone were placed in a 1-lit. four-necked flask. While agitating the mixture, 114 g of pure water and 1.0 g of 60% $HNO_3$ were dropped thereinto and heated at 60° C. for 15 hr to thereby carry out hydrolysis and polycondensation reaction.

The resultant reaction mixture was cooled to 30° C. or below and $HNO_3$ was removed therefrom by means of an anion exchange resin until the pH value became 5.5.

114.3 g of diacetone alcohol was added to the solution and concentrated in a vacuum distiller until the solid content became 30% by weight, thereby obtaining a zirconia containing silsesquioxane polymer solution (A).

Measurement by gel permeation chromatography showed that the average molecular weight of this zirconia containing silsesquioxane polymer was 43,000 in terms of polystyrene.

On the other hand, 367 g of silica sol (SI-30 produced by Catalysts & Chemicals Industries Co., LTD., average particle size: 12 nm, $SiO_2$ concentration: 30% by weight) and 4033 g of pure water were placed in a 10 lit. four-necked flask. While agitating the mixture, 3% NaOH was dropped so that the pH value was adjusted to 12. Thereafter, 1800 g of 35% aqueous hydrogen peroxide was added thereto and the temperature was raised to 80° C.

After the temperature reached 80° C., a solution of a mixture of 1375 g of a silicic acid solution having an $SiO_2$ concentration of 3% and 1095 g of pure water and a solution of a mixture of 106 g of zirconium ammonium carbonate and 2354 g of pure water were dropped over a period of 8 hr.

Thereafter, the resultant solution was introduced in an autoclave and heated at 140° C. for 15 hr. Then, the solution was cooled to 30° C. or below, deionized by an amphoteric ion exchange resin and adjusted so that the pH value became 3.

Methanol was added to the solution and a solvent replacement with methanol was carried out so that the water residue became 5 to 10% by weight by means of an ultrafilter membrane.

623 g of diacetone alcohol was added to the obtained solution and concentrated in a vacuum distiller until the solid content became 15% by weight, thereby obtaining a dispersion of fine particles of $SiO_2$—$ZrO_2$ composite oxide (B).

100 g of the above obtained zirconia containing silsesquioxane polymer solution (A), 50 g of the above obtained dispersion of inorganic oxide fine particles (B) and 10 g of ethyl carbitol were mixed together, thereby obtaining a coating liquid for forming a transparent coating (1).

This coating liquid for forming a transparent coating (1) was applied to a glass plate of 0.7 mm in thickness at a rotational frequency of 1000 rpm by the spin coating method and heated at 220° C. for 60 min, thereby obtaining a transparent coating film of 3.0 µm in thickness.

The obtained coating film was subjected to the following evaluations. The results are given in Tables 1 and 2.

Appearance of Coating Film: the surface condition was evaluated by a visual inspection.

Light Transmission: the light transmission was measured at wavelengths of 400 nm and 550 nm by the use of spectrophotometer (Ubest-55 manufactured by JASCO).

Smoothness: the surface smoothness was evaluated by the use of tracer surface roughness meter (Surfcom manufactured by Tokyo Seimitsu K.K.).

Adhesion: measured by the crosscut adhesion test in accordance with Japanese Industrial Standard K5400.

Hardness: evaluated in terms of pencil hardness in accordance with Japanese Industrial Standard K5400.

Amount of out gas: the substrate with transparent coating was placed in a sealed stainless steel vessel and, after evacuation to $1 \times 10^{-4}$ Torr at 20° C., immersed in a silicone oil bath heated at 250° C. and the time taken for the degree of vacuum to restore to the original $1 \times 10^{-4}$ Torr was measured.

Heat Resistance: the discoloration and appearance change of the coating film having been heated at 250° C. for 1 hr were visually inspected and the light transmission at wavelengths of 400 nm and 550 nm thereof was measured by the use of spectrophotometer (Ubest-55 manufactured by JASCO).

Sputtering Performance: an ITO film was formed at an RF power of 500 W and at a degree of vacuum of $4 \times 10^{-2}$ Torr by the use of sputtering device (HSR-521A manufactured by Shimadzu Corporation) over a period of 5 min, and thereafter the light transmission (400 nm and 550 nm) was measured and the degree of discoloration of the transparent coating film visually inspected.

Dielectric constant: the dielectric constant of the coating film was measured by the use of LCZ meter (2330A manufactured by NF Electronic Instrument).

Membrane Stress: the membrane stress of the coating film was measured by the use of membrane stress meter (FSM 8800).

With respect to the following items, the appearance change of the coating film and the adhesion thereof to the substrate were evaluated.

Boiling Water Resistance: the coating film was immersed in 100° C. boiling water for 10 min.

Acid Resistance: the coating film was immersed in a 10% aqueous hydrochloric acid solution heated at 40° C. for 30 min.

Alkali Resistance: the coating film was immersed in a 5% aqueous sodium hydroxide solution heated at 40° C. for 30 min.

Solvent Resistance: the coating film was immersed in ethanol maintained at 25° C. for 30 min.

Solvent Resistance: the coating film was immersed in N-methylpyrrolidone maintained at 25° C. for 30 min.

Solvent Resistance: the coating film was immersed in γ-butyrolactone maintained at 25° C. for 30 min.

Aqua Regia Resistance: the coating film was immersed in 50% aqua regia maintained at 25° C. for 30 min.

TABLE 1

| Coating appearance | | No abnormality |
|---|---|---|
| Light transmission (%) | (400 nm) | 99.0 |
| | (550 nm) | 99.9 |
| Smoothness | | 0.005 |
| Adhesion | | 100/100 |
| Hardness | | 4 H |
| Amount of out gas | | 30 minutes |
| Heat Resistance | | |
| light transmission (%) | (400 nm) | 99.0 |
| | (550 nm) | 99.9 |
| coating appearance | | No change |
| Sputtering Performance | | |
| light transmission (%) | (400 nm) | 99.0 |
| | (550 nm) | 99.9 |
| coating appearance | | No discoloration |
| Dielectric constant | | 2.5 |
| Membrane stress (dyn/cm$^2$) | | 2.1 × 10$^8$ |

TABLE 2

| | Coating appearance | Adhesion |
|---|---|---|
| Boiling water resistance | No change | 100/100 |
| Acid resistance | ditto | ditto |
| Alkali resistance | ditto | ditto |
| Ethanol resistance | ditto | ditto |
| NMP resistance | ditto | ditto |
| γ-butyrolactone resistance | ditto | ditto |
| Aqua regia resistance | ditto | ditto |

Example 2
(TFT Liquid Crystal Display)

An active matrix substrate was prepared by forming an array composed of a TFT element, a scanning electrode, a data electrode, etc. on a glass plate.

The coating liquid for forming a transparent coating (1) prepared in Example 1 was applied onto this substrate at a rotational frequency of 1500 rpm by the spin coating method and heated at 220° C. for 60 min, thereby obtaining a flattening coating film of 1.4 μm in thickness.

After the formation of the flattening coating film, the irregularity of the TFT array portion was measured by the use of a tracer level difference meter. The 0.7 μm irregularity was reduced to 0.05 μm.

Subsequently, a contact hole was formed in the above substrate provided with the flattening coating film in accordance with the customary procedure, and an ITO film was formed thereon at 250° C. by the sputtering method. Thereafter, a display electrode was formed by the customary patterning procedure. An alignment coating film was formed on the substrate provided with the display electrode, and a rubbing treatment thereof was conducted. The resultant substrate was bonded with an opposite common electrode bearing substrate with a spacer interposed therebetween by means of a sealant, and a liquid crystal was injected into the space to thereby obtain a liquid crystal display.

The display characteristics of the liquid crystal display were evaluated. Substantially no light escape or occurrence of domain attributed to a liquid crystal alignment turbulence at an upper portion of the TFT array was observed, a contrast improvement was recognized and a high-quality display was attained.

Example 3
(Liquid Crystal Display with Color Filter)

The coating liquid for forming a transparent coating (1) prepared in Example 1 was applied onto a glass plate provided with a color filter at a rotational frequency of 1200 rpm by the spin coating method and heated at 220° C. for 60 min, thereby obtaining a flattening protective coating film of 2.0 μm in thickness.

After the formation of the flattening protective coating film, the irregularity of the color filter portion was measured by the use of a tracer level difference meter. The 1.5 μm irregularity was reduced to 0.2 μm.

Subsequently, an ITO film was formed on the above substrate provided with the flattening protective coating film at 250° C. by the sputtering method. This ITO film was patterned by the customary procedure, thereby forming a display electrode. An alignment coating film was formed on the substrate provided with the display electrode, and a rubbing treatment thereof was conducted. The resultant substrate was bonded with an opposite common electrode bearing substrate with a spacer interposed therebetween by means of a sealant, and a liquid crystal was injected into the space to thereby obtain a liquid crystal display. The display characteristics of the liquid crystal display were evaluated. Color display with excellent contrast was attained, and a high-quality display was realized with substantially no light escape or occurrence of domain attributed to a liquid crystal alignment turbulence.

Example 4

The coating liquid for forming a transparent coating (1) prepared in Example 1 was applied onto a 4 inch silicon semiconductor substrate provided with a model Al wiring of 0.5 μm level difference line and space at a rotational frequency of 1200 rpm by the spin coating method and heated at 220° C. for 60 min, thereby obtaining a coating film of 2.0 μm in thickness. This coating film was dried at 150° C. for 2 min and fired at 420° C. for 1 hr in an atmosphere of $N_2$, thereby obtaining a silica insulating coating film of low permittivity.

The obtained insulating coating film had a high flatness and had no cracking.

This insulating coating film was provided with a contact hole by the lithography method or etching method. The etching rate was 1500 Å/min. The thus obtained substrate with the contact hole bearing insulating coating film was allowed to stand still in the air for one week and, thereafter, an upper Al wiring was formed on the silica coating film by the sputtering method.

Electricity was passed between the above Al wirings for 1000 hr. The difference between the resistance value prior to the passage of electricity and the resistance value after the passage of electricity was 3%.

What is claimed is:
1. A coating liquid for forming a transparent coating, consisting essentially of $SiO_2$ and:
   (A) fine particles of an oxide of at least one element selected only from the group consisting of Ti, Zr, V, Nb, Cr, Mo, W, Al, Mn, Fe, Co, and Ni, said particles having an average particle size of 5 to 50 nm, and
   (B) a polymer product, which is an organosilicon compound containing a transition metal element having an average molecular weight of from 1,000 to 100,000 measured using gel permeation chromatography using polystyrene standards, said polymer product being obtained by hydrolysis followed by polycondensation of a mixture of an organosilicon compound and a transition metal compound concurrently in an organic solvent containing water in the presence of a catalyst at 40 to 120° C., said organosilicon compound being a trifunctional alkoxysilane represented by the general formula (I):

wherein R and R' represent organic groups which may be identical with each other or different from each other.

2. A substrate with transparent coating comprising a transparent coating film formed from the coating liquid as claimed in claim 1.

3. The coating liquid as claimed in claim 1, wherein the average molecular weight of the organosilicon polymer product containing a transition metal element (B) is 5,000 to 50,000 in terms of polystyrene.

4. The coating liquid as claimed in claim 1, wherein the organosilicon polymer product containing a transition metal element (B) is a silsesquioxane polymer having a ladder structure.

5. The coating liquid as claimed in claim 1, wherein the organosilicon polymer product containing a transition metal element (B) is a silsesquioxane polymer having a cage structure.

6. The coating liquid as claimed in claim 1, wherein the organosilicon polymer product containing a transition metal element (B) is obtained by hydrolyzing a mixture of 100 parts by weight, based on $SiO_2$, of the organosilicon compound and 0.1 to 30 parts by weight, based on oxide, of a transition metal compound concurrently in an organic solvent containing water in the presence of a catalyst at 40 to 120° C.

7. The coating liquid as claimed in claim 6, wherein the amount of water added for hydrolysis ranges from 50 to 200 parts by weight per 100 parts by weight, based on $SiO_2$, of the organosilicon compound.

8. The coating liquid as claimed in claim 1, wherein the fine particles of the oxide (A) are present in an amount of from 2 to 50% by weight.

9. The coating liquid as claimed in claim 1, wherein the fine particles of the oxide (A) are present in an amount of from 3 to 40% by weight.

10. The coating liquid as claimed in claim 1, wherein the organosilicon polymer product containing a transition metal element (B) is present in an amount of from 5 to 60% by weight.

11. The coating liquid as claimed in claim 1, wherein the organosilicon polymer product containing a transition metal element (B) is present in an amount of from 7 to 40% by weight.

12. The coating liquid as claimed in claim 1, wherein said fine particles comprise an amount of OH groups on their surface sufficient to provide adhesion to a substrate.

* * * * *